United States Patent
Papantoniou

(10) Patent No.: US 11,623,472 B2
(45) Date of Patent: Apr. 11, 2023

(54) VARIABLE COMPLIANCE METALLIC WHEEL COMPRISING TORQUE MEASURING DEVICE

(71) Applicant: HTR SA, Elafonisos Lakwnias (GR)

(72) Inventor: Vassilios Papantoniou, Kifisia (GR)

(73) Assignee: HTR SA, Elafonisos Lakwnias (GR)

( * ) Notice: Subject to any disclaimer, the term of this patent is extended or adjusted under 35 U.S.C. 154(b) by 252 days.

(21) Appl. No.: 17/123,796

(22) Filed: Dec. 16, 2020

(65) Prior Publication Data

US 2022/0185011 A1    Jun. 16, 2022

(51) Int. Cl.
| | |
|---|---|
| *B60B 19/04* | (2006.01) |
| *B60B 27/02* | (2006.01) |
| *B60C 7/06* | (2006.01) |
| *B60C 7/14* | (2006.01) |
| *B60C 7/18* | (2006.01) |
| *B60B 25/00* | (2006.01) |
| *B60B 9/26* | (2006.01) |

(Continued)

(52) U.S. Cl.
CPC ................ *B60B 19/04* (2013.01); *B60B 9/04* (2013.01); *B60B 9/26* (2013.01); *B60B 25/002* (2013.01); *B60B 27/02* (2013.01); *B60C 7/06* (2013.01); *B60C 7/143* (2013.01); *B60C 7/18* (2013.01); *B60B 9/02* (2013.01); *B60B 2900/351* (2013.01)

(58) Field of Classification Search
CPC .... B60B 9/02; B60B 9/04; B60B 9/26; B60B 19/04; B60B 27/02; B60B 25/002; B60B 2900/351; B60C 7/06; B60C 7/143; B60C 7/18
See application file for complete search history.

(56) References Cited

U.S. PATENT DOCUMENTS

| | | |
|---|---|---|
| 305,769 A | 9/1884 | Williams |
| 718,096 A | 1/1903 | Cook |
| | (Continued) | |

FOREIGN PATENT DOCUMENTS

| | | |
|---|---|---|
| JP | H04221201 A | 8/1992 |
| KR | 20160120920 A | 10/2016 |
| WO | 2017/116454 A1 | 7/2017 |

OTHER PUBLICATIONS

European Search Report issued in corresponding European Patent Application No. 20201510.3 dated Feb. 5, 2021.

(Continued)

*Primary Examiner* — Kip T Kotter
(74) *Attorney, Agent, or Firm* — Finch & Maloney PLLC

(57) ABSTRACT

A variable compliance non-pneumatic wheel which comprises a stationary tubular body (32) attached to the vehicle chassis. A tubular member is freely rotatable relative to the stationary tubular body and has a series of peripheral mounting rods (12, 13) on sides of the wheel. A plurality of interconnected and freely rotating caterpillar-like tiles (5), which are in contact with the ground during wheel operation, are coupled to the outer periphery of the wheel. A plurality of connecting spring members, (3, 4, 6, 7, 8, 9, 10, 11), each connecting a specific mounting rod on a side of the hub (1, 2) are configured to connect the tiles (5) to the hub. The tubular member is split in two parts (1, 2) which are each free to rotate relative to one another. Each part carries approximately half number of mounting rods and connecting springs on a respective side of the wheel.

8 Claims, 13 Drawing Sheets

Figure 1:
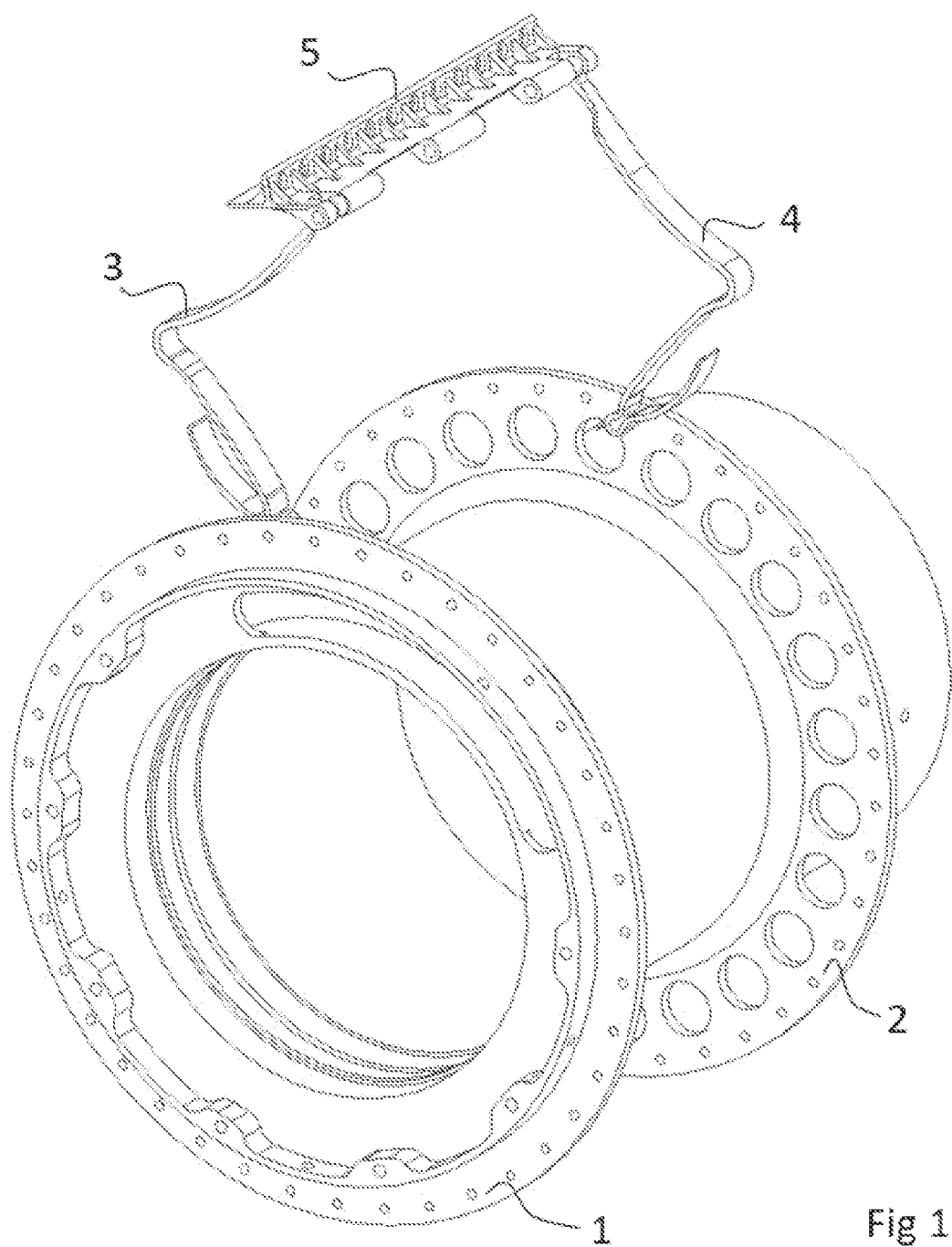

(51) Int. Cl.
*B60B 9/04* (2006.01)
*B60B 9/02* (2006.01)

(56) References Cited

U.S. PATENT DOCUMENTS

| | | | |
|---|---|---|---|
| 1,103,045 | A * | 7/1914 | Hawley ............... B60C 7/18 |
| | | | 152/262 |
| 1,254,505 | A | 1/1918 | John |
| 1,308,633 | A | 7/1919 | Horne |
| 6,170,544 | B1 | 1/2001 | Hottebart |
| 8,950,451 | B2 | 2/2015 | Abe |
| 10,427,461 | B1 * | 10/2019 | Padula, II ............... B60C 9/023 |
| 2002/0096237 | A1 | 7/2002 | Burhoe et al. |
| 2004/0069385 | A1 | 4/2004 | Timoney et al. |
| 2009/0033051 | A1 | 2/2009 | Ahnert |
| 2009/0211675 | A1 | 8/2009 | Louden |
| 2009/0294000 | A1 | 12/2009 | Cron |
| 2010/0218869 | A1 * | 9/2010 | Abe ............... B60C 7/18 |
| | | | 152/246 |
| 2010/0300587 | A1 * | 12/2010 | Benzing, II ............... B60B 9/06 |
| | | | 152/16 |
| 2011/0240193 | A1 | 10/2011 | Matsuda et al. |
| 2011/0272254 | A1 | 11/2011 | Anderfaas et al. |
| 2011/0278911 | A1 * | 11/2011 | Funaki ............... B60B 9/00 |
| | | | 301/62 |
| 2014/0110024 | A1 | 4/2014 | Anderfaas et al. |
| 2014/0251517 | A1 * | 9/2014 | Dutton ............... B60B 9/26 |
| | | | 152/17 |
| 2014/0345761 | A1 | 11/2014 | Visscher |
| 2016/0016426 | A1 | 1/2016 | Endicott |
| 2016/0193876 | A1 | 7/2016 | Kyo et al. |
| 2016/0214435 | A1 | 7/2016 | Schaedler et al. |
| 2017/0120671 | A1 | 5/2017 | Miles et al. |
| 2018/0072095 | A1 | 3/2018 | Anderfaas et al. |
| 2019/0126673 | A1 | 5/2019 | Celik et al. |

OTHER PUBLICATIONS

Greek Search Report Corresponding to Greek Application No. 20190100460 dated Sep. 2, 2020.

* cited by examiner

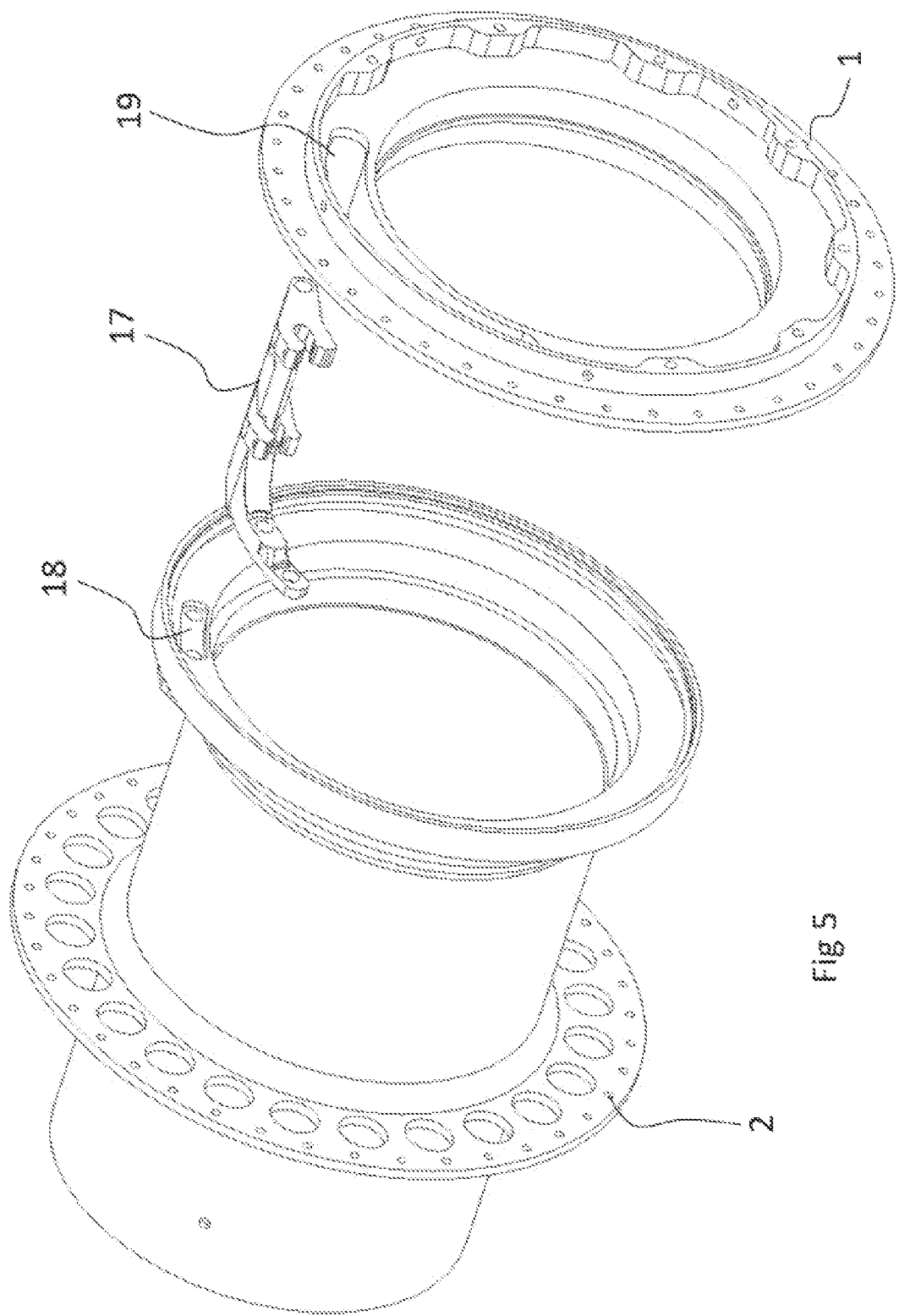

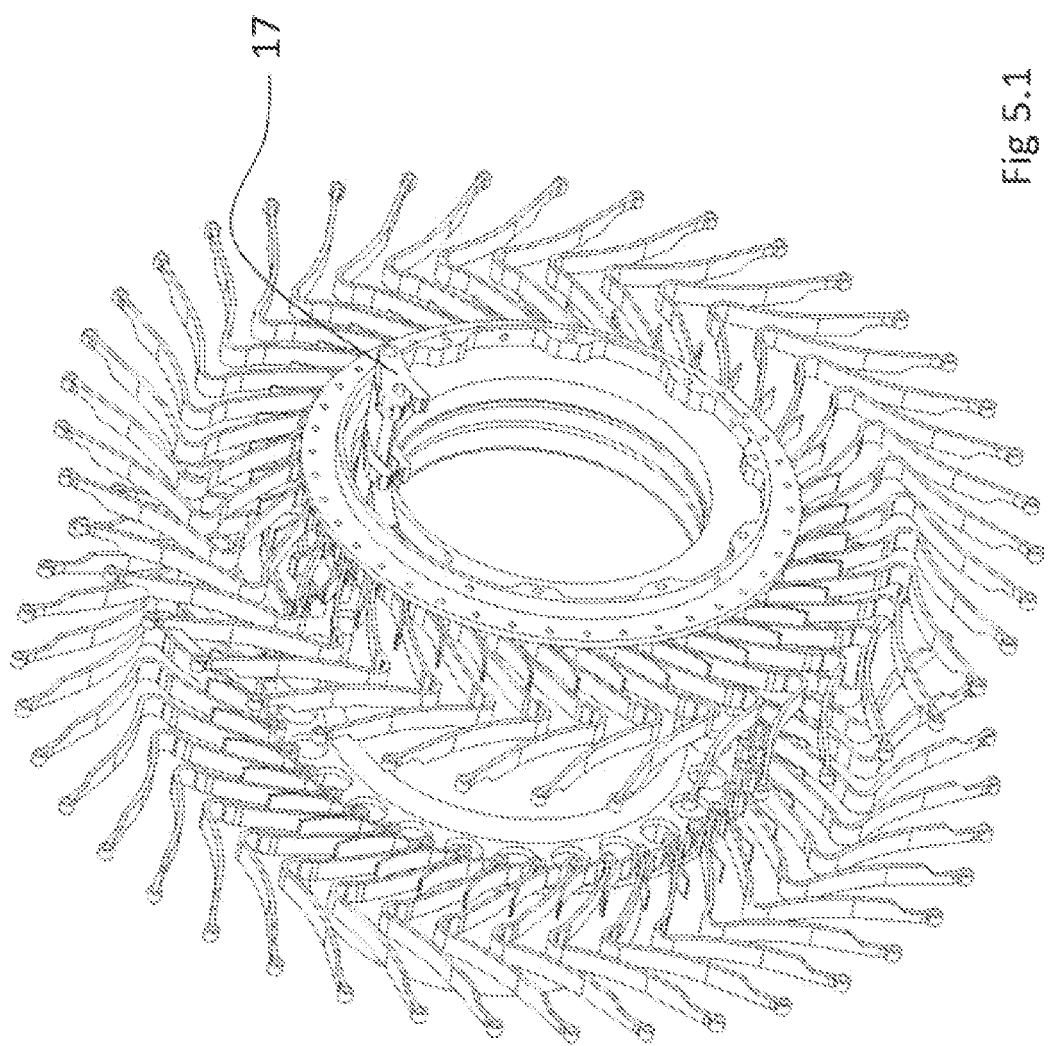
Fig 5.1

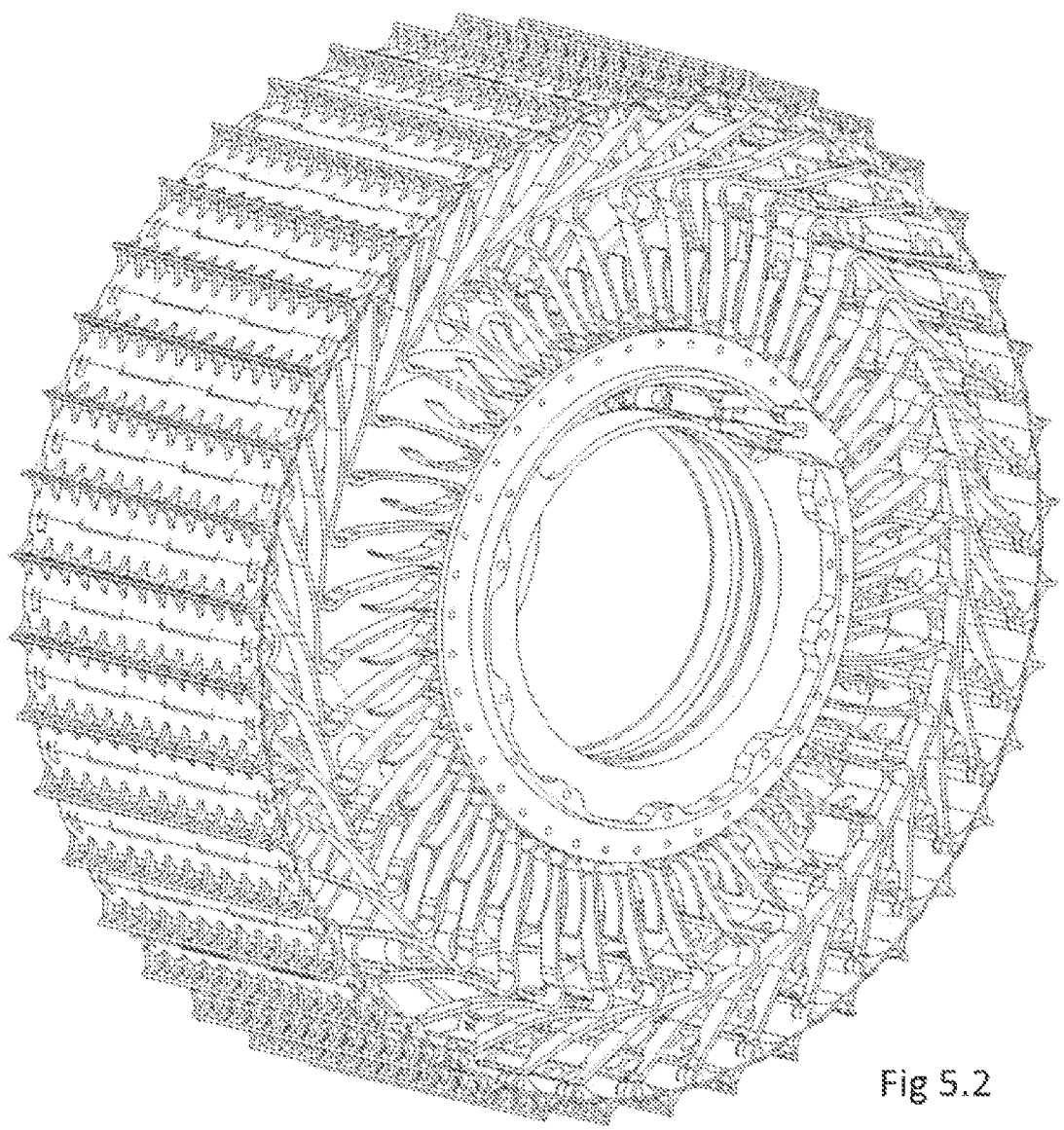
Fig 5.2

VARIABLE COMPLIANCE METALLIC WHEEL COMPRISING TORQUE MEASURING DEVICE

1. FIELD OF INVENTION

The present invention relates to a non-pneumatic tire that can be used without filling it with pressurized air, with the capacity to alter its flexibility during operation as well as to measure the torque generated by or submitted to the wheel axis during operation.

2. DESCRIPTION OF RELATED ART

U.S. Pat. No. 6,170,544 B1 Hottebart Jan. 9, 2001 refers to a Non-Pneumatic Deformable Wheel
US 2017/0120671 A1 Miles et al. May 4, 2017 refers to Non-Pneumatic Tire with Partially Compliant Hub
US 2018/0072095 A1 Anderfaas et al. Mar. 15, 2018 refers to Variable Compliance Wheel
U.S. Pat. No. 8,950,451 B2 Akihiko Abe Feb. 10, 2015 refers to Non-Pneumatic Tire
US 20020096237 A1 Buhroe et al. Jul. 25, 2002 refers to Compliant rim wheel and assembly
US 2009/0211675 A1 Louden B. Aug. 27, 2009 refers to Non-Pneumatic Tyre Assembly
US 2014/0110024 A1 Anderfaas et al. Apr. 24, 2014 refers to Variable Compliance Wheel
US 2016/0193876 A1 Kyo et al. Jul. 7, 2016 refers to Non-Pneumatic Tire
US 2011/0240193 A1 Matsuda et al. Oct. 6, 2011 refers to Non-Pneumatic Tire and Method of Manufacturing Same
US 2009/0033051 A1 Ahnert S. Feb. 5, 2009 refers to Stroller Wheel with Modular Suspension
US 2009/0294000 A1 Cron S. M. Dec. 3, 2009 refers to Variable Stiffness Spoke for a Non-Pneumatic Assembly
US 2016/0016426 A1 Endicott J. M. Jan. 21, 2016 refers to Non-Pneumatic Wheel Assembly with Removable Hub
US 2004/0069385 A1 Timoney et al. Apr. 15, 2004 refers to Wheel
US 2016/0214435 A1 Schaedler et al. Jul. 8, 2016 refers to Wheel Assemblies with Non-Pneumatic Tires An important number of patents has been deposited in the field of non-pneumatic wheels. Non pneumatic wheels have the advantages of pneumatic tires regarding shock absorption from road irregularities, while avoiding the disadvantages, such as tire failure due to puncturing. In recent years patent applications, as is shown on the list above, a non-pneumatic tire including an attachment body attached to an axle, a ring-shaped body configured to surround the attachment body from the outside in a tire radial direction, and a plurality of connecting members disposed between the attachment body and the ring-shaped body in a tire circumferential direction have been proposed. Additionally in recent years, research has been addressing the use of metallic wheels for planetary exploration, since on planets without or with very thin atmosphere the use of pneumatic tires is impossible, due to the presence of radiation that quickly deteriorates rubber and could render inflated tires useless.

Additionally, the measuring of the torque developed on the wheel axis by an electric motor used for driving the wheel, when a high ratio reduction gearbox is used, represents a technical problem that requires the use of a torque sensor combined with a continuous rotation electrical connection (slip ring), in order to measure the developed torque. This assembly has substantial volume and increased price and mass. The measurement of the torque on the other hand, is important for the safety of the vehicle, especially when the wheel is mounted on unmanned rovers operating in remote areas or on other planets.

3. BRIEF DESCRIPTION OF THE INVENTION

The invention consists in a non-pneumatic wheel design that has the possibility to behave like a pneumatic tire, but also modify its radial stiffness by means of a mechanism carried inside the wheel, that is able to operate even when the wheel is in motion, as well as a simple torque sensor solution that can be incorporated in the drive train of the wheel and monitor the torque developed by, or exerted to the wheel during its operation.

4. ADVANCEMENT OVER THE STATE OF ART

The invention proposes a solution to stiffness adjustment of non-pneumatic wheels as well as a solution to durability issues related to elastic materials (metallic, resin etc), used as deformable spokes for non-pneumatic wheels. The invention proposes a specially designed leaf spring element that is tailored for the specific function of stiffness adjustment and presents the desired durability requirements during operation, combined with its specially designed shape that enables the variation of the radial flexibility of the wheel by the counter-rotation of the hub disks holding these springs. In that way, the proposed invention solves both durability issues related to non-pneumatic wheels as well as the issue of regulating wheel stiffness, as a function of road condition and wheel axis load. The invention provides a technically viable simple solution for the regulation of wheel radial stiffness, even when the wheel is in operation, through the motorized counter-rotation of the said hub disks. Finally, the invention proposes a simple and robust solution for measuring the torque developed or exerted on the wheel axis during operation, which is a feature needed for the safety of the operation of unmanned electric vehicles moving on rough terrain, especially if they operate in remote environments or other planets. In such cases, if for example, a wheel becomes blocked, the torque sensor can inform the controller of the vehicle and prevent damage on the motor of the wheel.

5. BRIEF DESCRIPTION OF THE DRAWINGS

Other objects, features and advantages will occur to those skilled in the art from the following description of a preferred embodiment and the accompanying figures, without departing from the spirit of the invention.

FIG. 1 presents the two split hubs of the wheel with two spring elements mounted on them, connected to a single tile.

Figure 2:
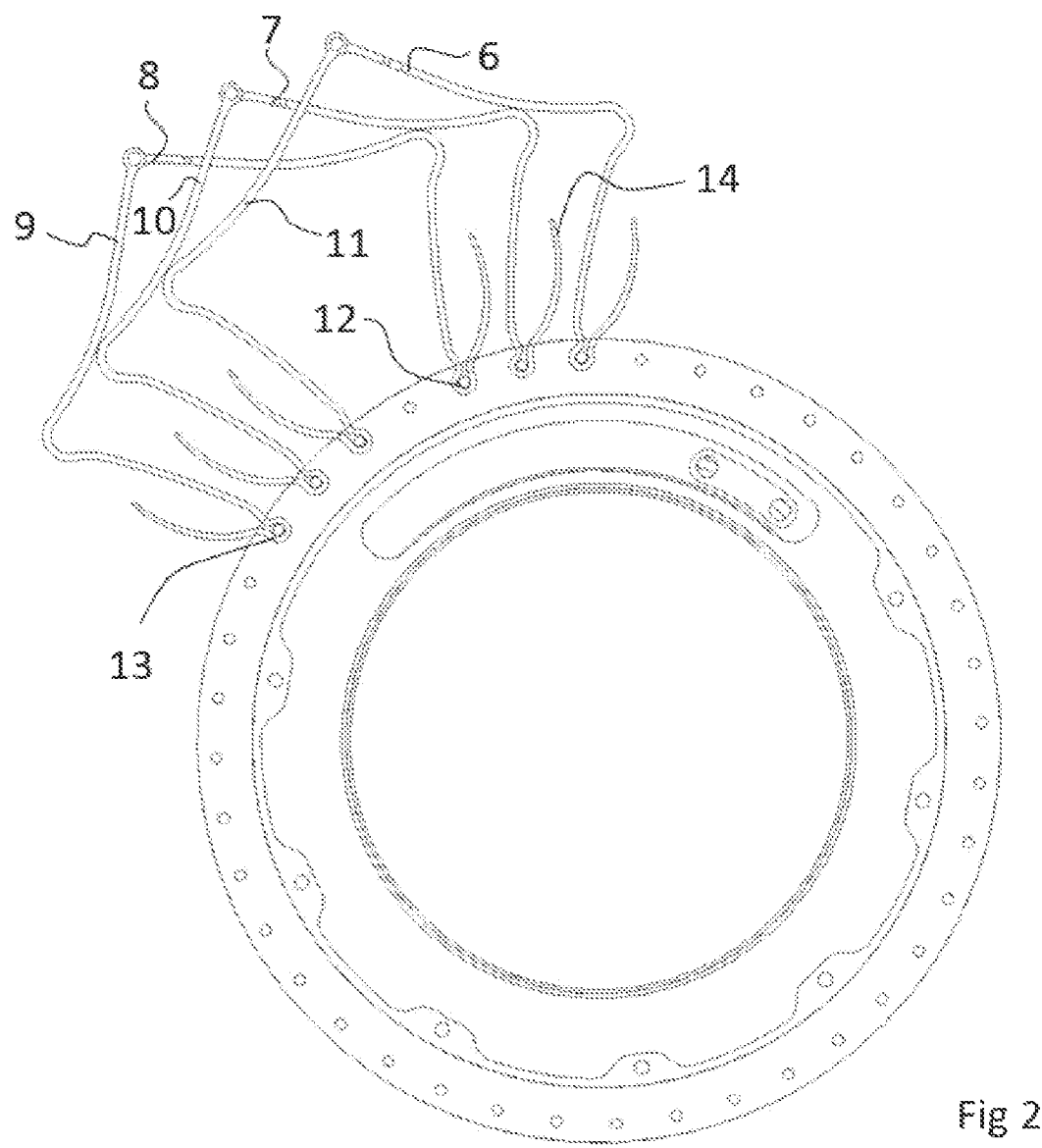

FIG. 2 presents the side view of the two split hubs assembly with 3 pairs of springs mounted on them, with the relative angle between the two hubs in relaxed position.

Figure 3:
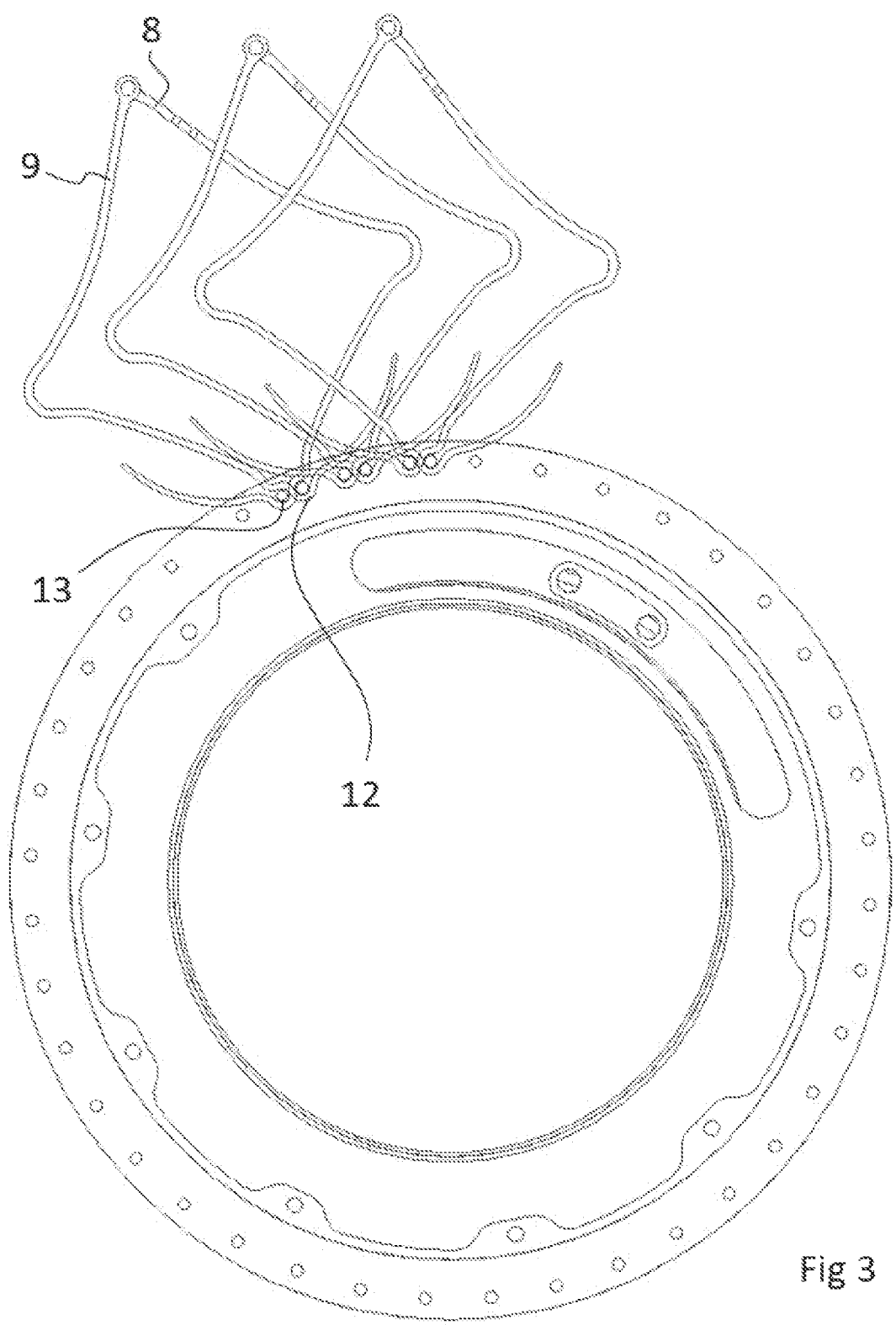

FIG. 3 presents the side view of the two split hubs assembly with 3 pairs of springs mounted on them, with the relative angle between the two hubs in preload position.

Figure 4:
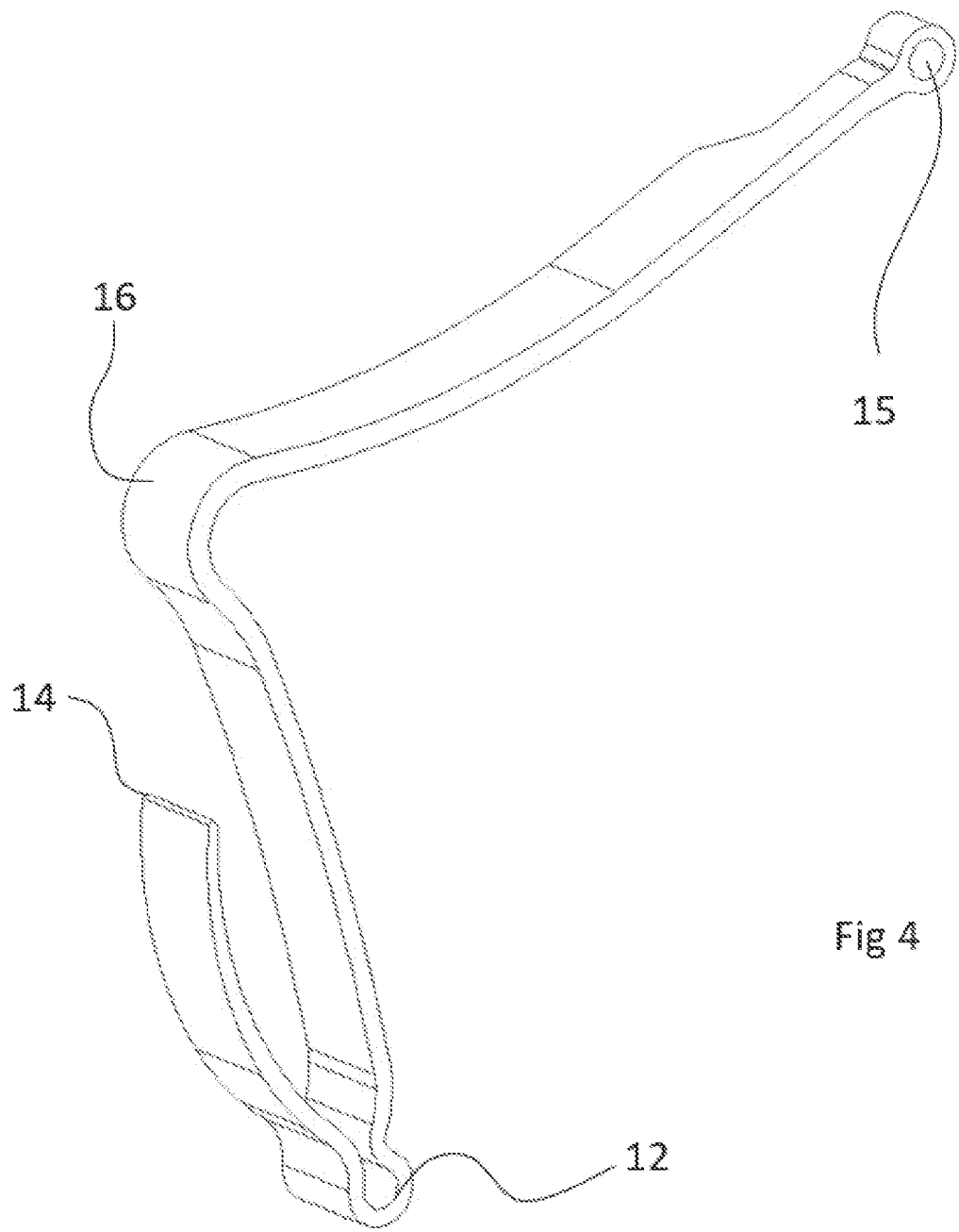

FIG. 4 presents a detail of the spring.

FIG. 5 presents the two split hubs of the wheel with the rigid lever that links the first hub and transmits forces to the second hub in disassembled view.

FIG. 5.1 presents the assembled hubs with springs as well as the rigid lever linking the hubs.

FIG. 5.2 presents the assembled hubs with springs and tiles as well as the rigid lever linking the two hubs.

Figure 6:
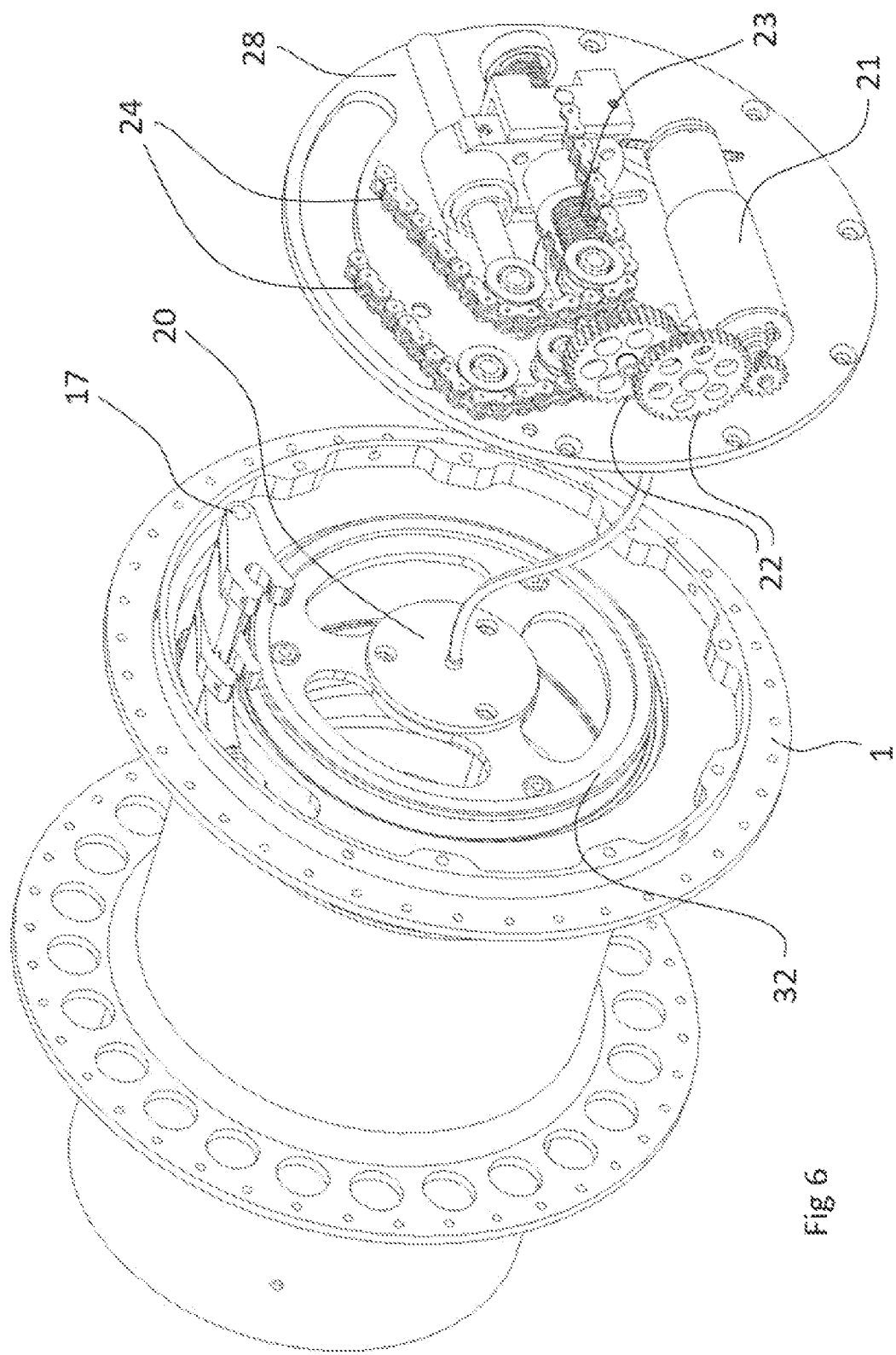

FIG. 6 presents the slip ring used to provide power to the preload mechanism of the springs and the details of the preload mechanism prior to assembly.

Figure 7:
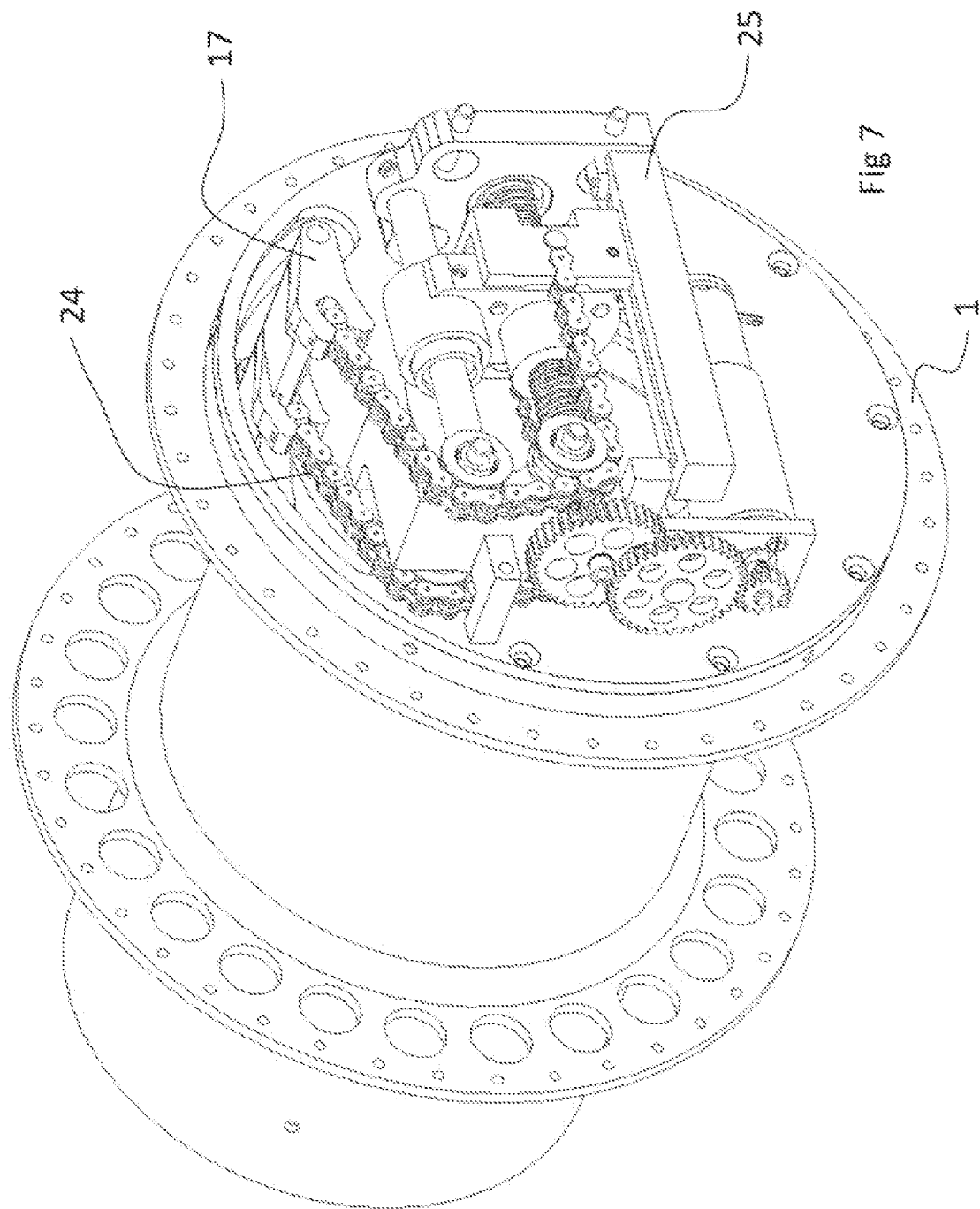

FIG. 7 presents the fully assembled preload mechanism connected to the rigid lever linking the hubs.

Figure 8:
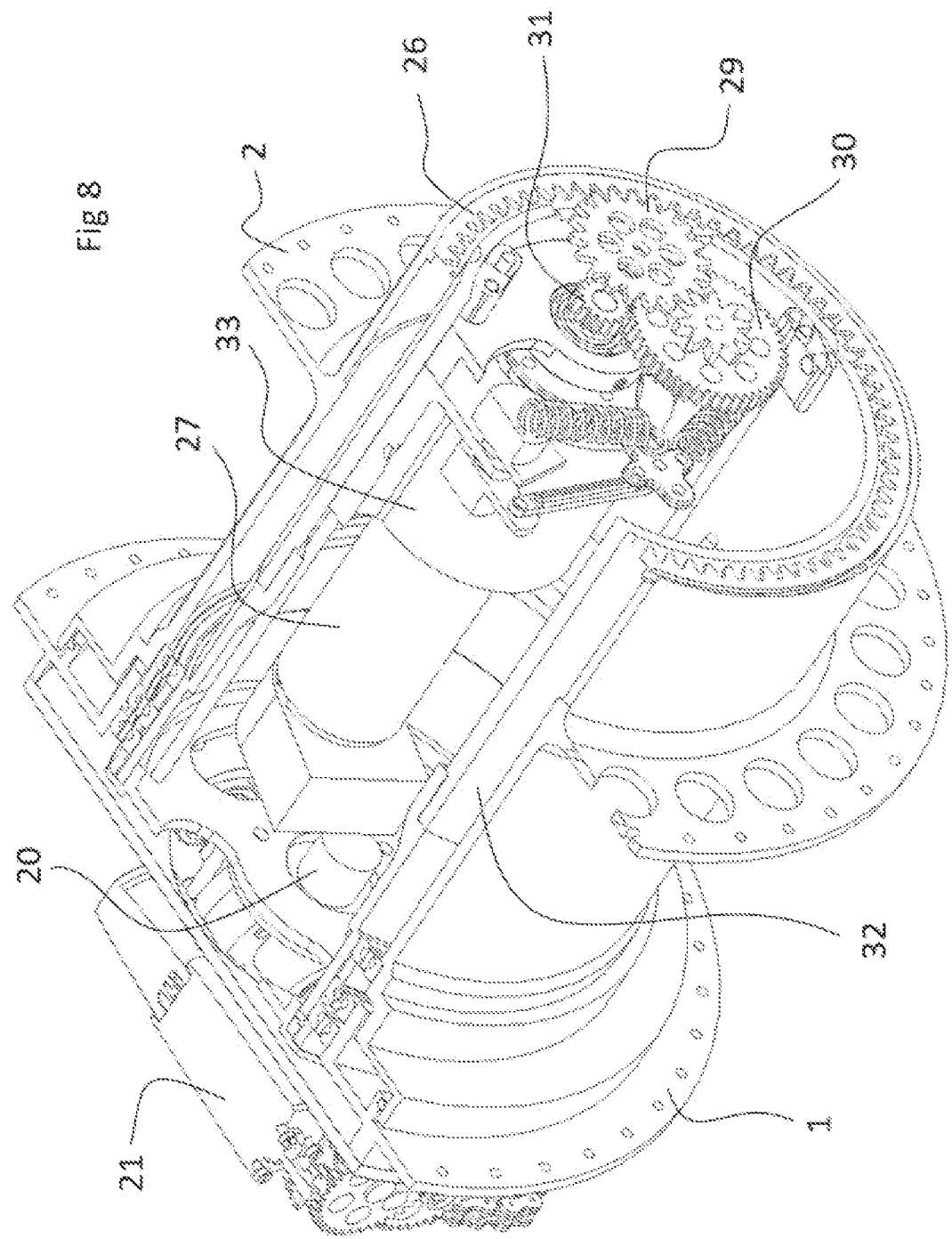

FIG. 8 presents the fixed hollow axis of the wheel with the drive motor and internal gear.

Figure 9:
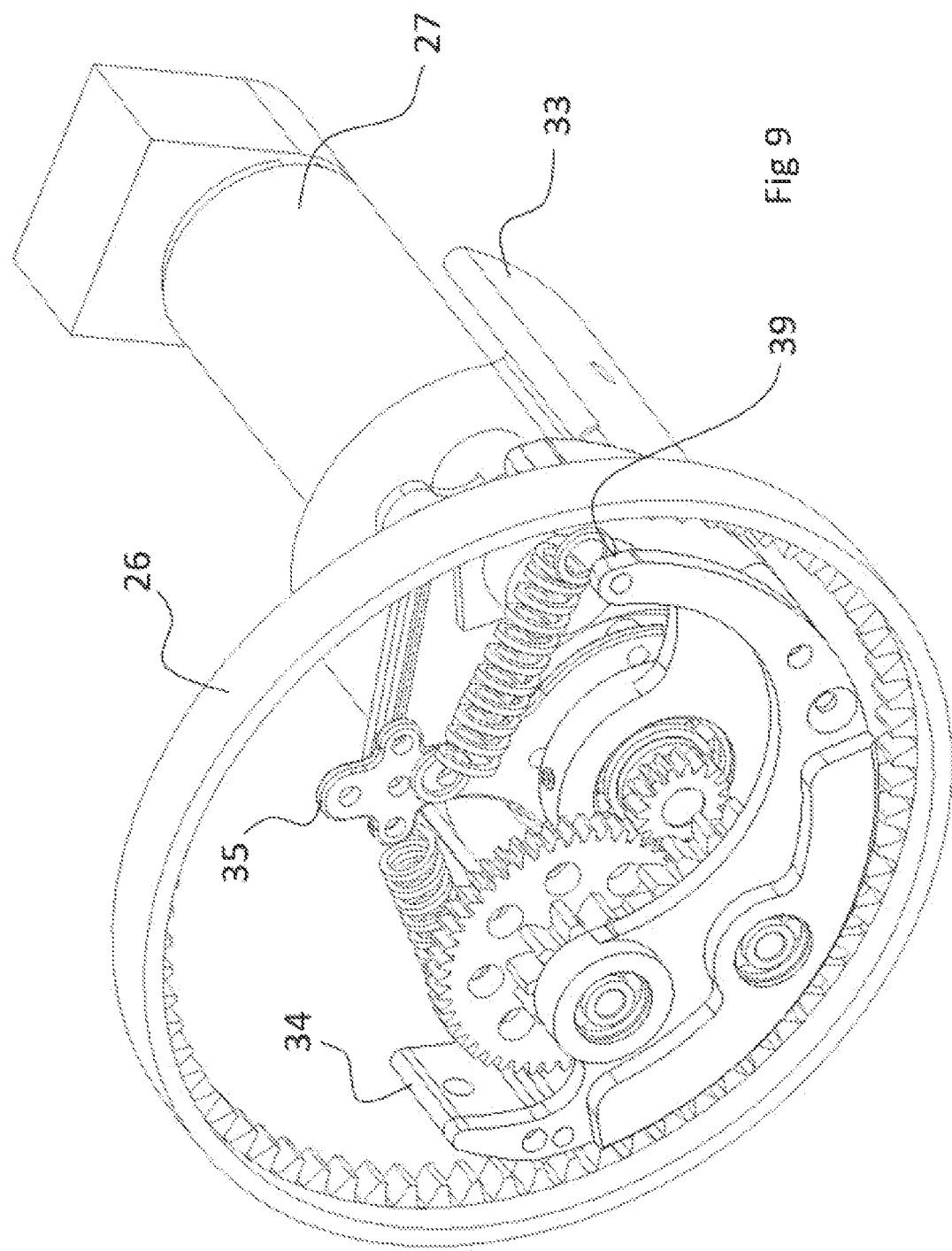

FIG. 9 presents the isolated drive motor and gearbox assembly as well as the torque measuring system.

Figure 10:
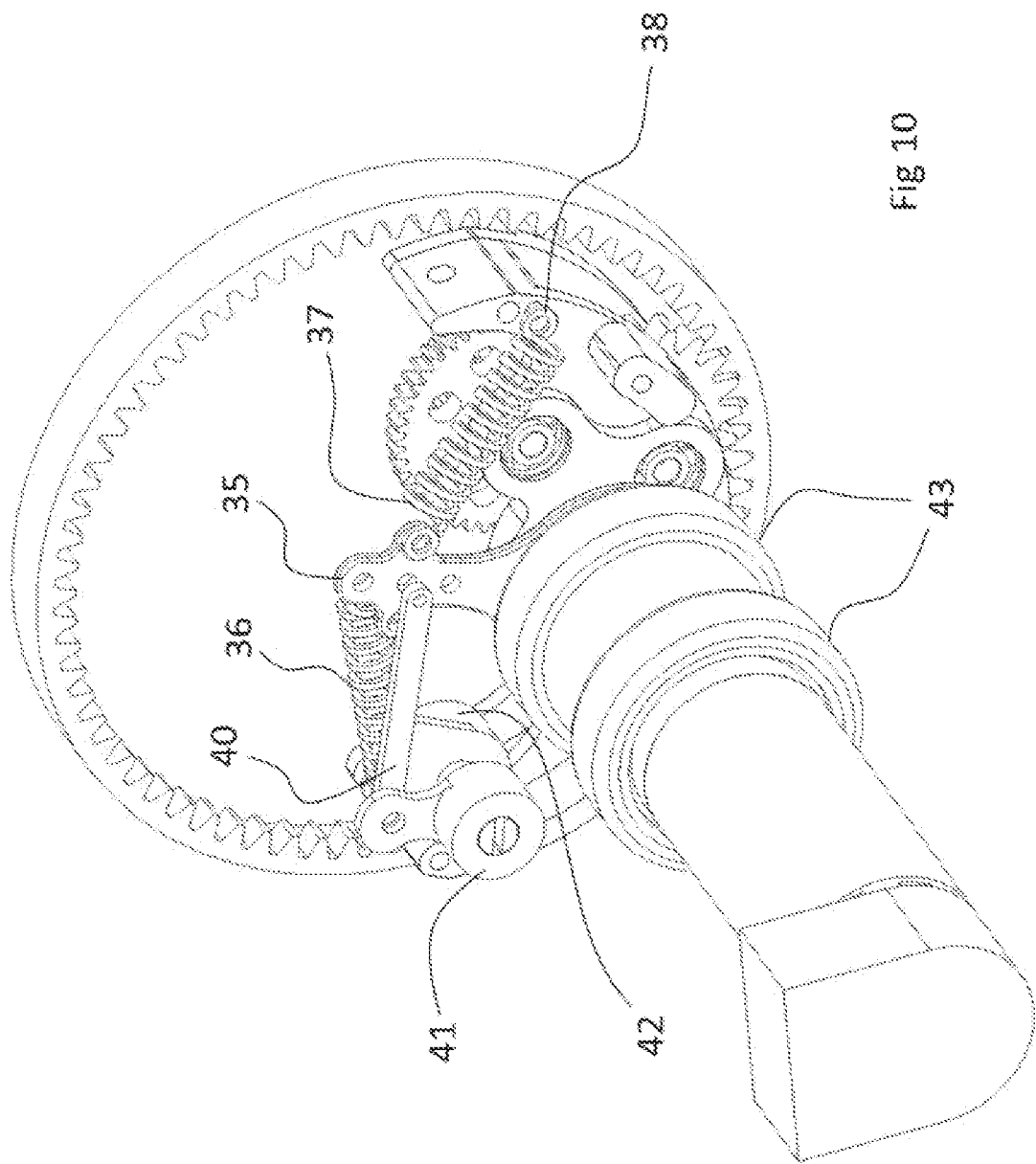
Figure 11:
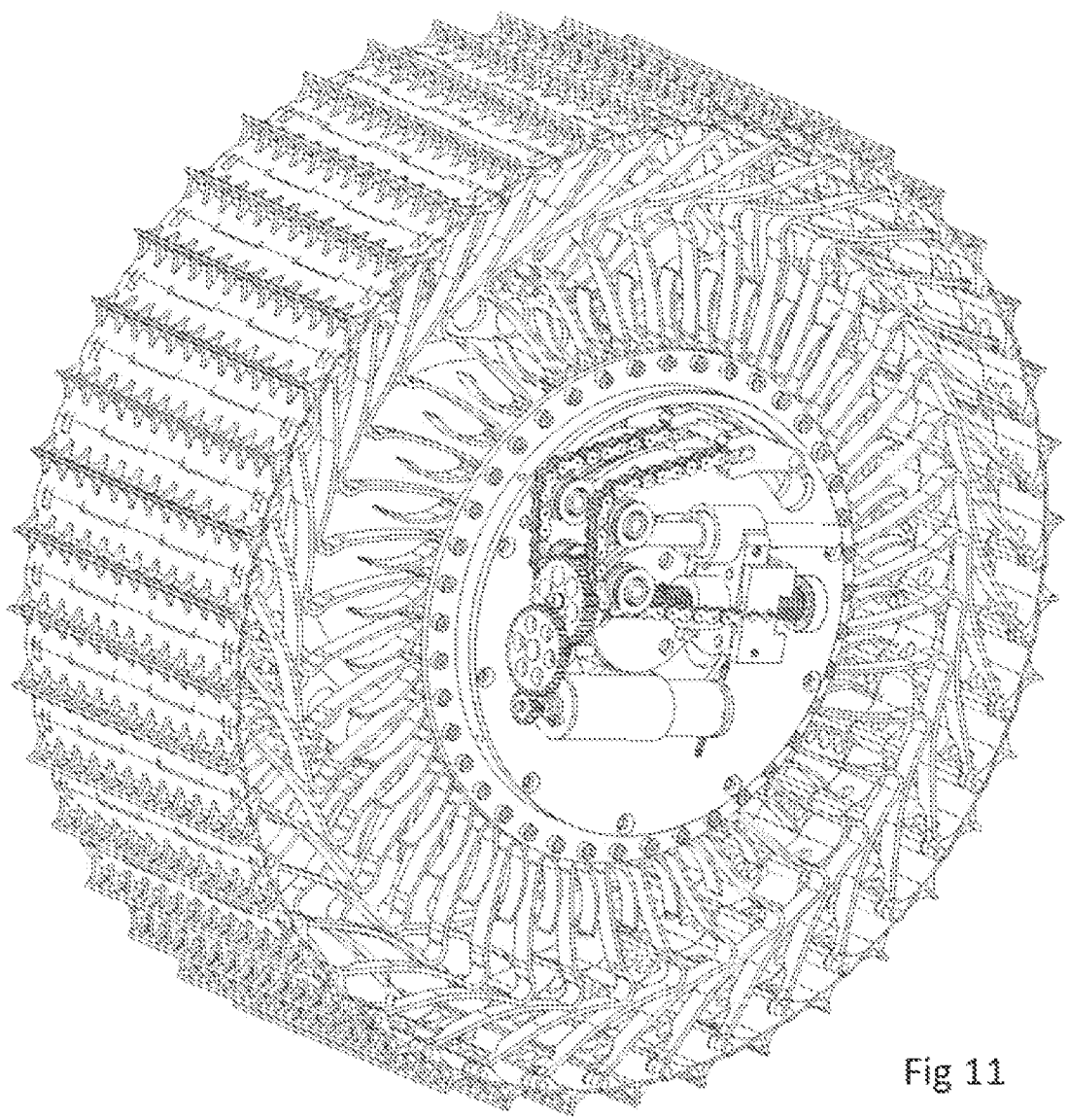

FIG. 10 presents a rear view of the motor mechanism and torque measuring system FIG. 11 presents the complete wheel assembly.

6. DISCLOSURE OF THE PREFERRED EMBODIMENT

Hereinafter, an embodiment of a non-pneumatic tire according to the present invention will be described with reference to FIGS. 1 to 11.

FIG. 1 presents the two split hubs of the wheel, split hub 1 and split hub 2, on each one of which a leaf spring 3 and 4 respectively is mounted on one of a plurality of holes of their periphery, by means of a mounting rod. The springs are free to rotate around their mounting rods. Both springs are shown connected to a single tile 5, via also a freely rotating joint that also serves as free rotating joint connecting the tile with its adjacent tiles, thus forming a circular multi-tile caterpillar chain, representing the part of the wheel that enters in contact with the ground. The relative angle between the two split hubs can be modified, in a way to bring closer the mounting points of each spring on their respective hub and also decrease the distance of the concave sections of each of the two springs 3 and 4. To better appreciate the effects of such angle variation, FIGS. 2 and 3 need to be presented.

FIG. 2 presents the side view of the same said assembly of the two split hubs, only this time 3 springs numbered 6, 7 and 8 are mounted on 3 adjacent mounting rods of the hub 2 and another 3 springs numbered 9, 10, 11 are mounted on 3 adjacent rods of hub 1, with each pair of said springs connected to 3 adjacent tiles of the wheel periphery (Hubs 1 and 2 are seen from the side). In this figure, the relative angle between hub 1 and hub 2 is in fully relaxed position, with the mounting points 12 and 13 of springs 8 and 9 on their respective hubs being at maximum distance. Also, it can be seen that the curved tails of each spring (for example tail 14 of spring 7) are not in contact with the bodies of their respective adjacent springs (tail 14 is not in contact with the body of spring 6, etc). In this case, a zero pre-load condition exists in all springs. A radial force exerted on a tile, for example the tile supported by springs 8 and 9, generates easily the deformation of the said springs. It must be noted that the wheel assembly in this case is unable to transmit torques to the periphery of the wheel, since the springs rotate freely around their respective joints and in that way the torque is not transmitted. The case is therefore illustrated here as an example of spring condition. This condition can be encountered during the manufacturing of the wheel, but it is avoided during the use of the wheel in operation. During operation, the springs must be at least preloaded at a minimum value, in order to be able to transmit torques to the wheel periphery. This situation is depicted in an exaggerated manner in FIG. 3. In FIG. 3, the relative angle of the two hubs has been modified by a few degrees. This rotation has brought much closer the mounting points 12 and 13 of springs 8 and 9 respectively. These new positions have forced the tails of each said spring to come in contact with the respective body of the adjacent spring, therefore forcing each said spring element to preload against the corresponding spring of the opposite hub that is connected on the same tile (for example, spring 8 and 9). The generated resulting force from each pair of springs pushes each tile along the radial dimension, in a way to increase the periphery of the wheel. Since the tiles are all interconnected, the periphery of the wheel does not change, but the resulting forces generated by all springs increase the apparent radial stiffness of the wheel, since the deformation of the pre-loaded springs for a given radial load requires now a much higher force. However, in this exaggerated condition where the mounting rods 12 and 13 have come so close to each other, again the wheel hubs cannot transmit important torques to the wheel periphery. A very important torque would again cause the spring pair to rotate instead to cause the wheel to rotate. The ideal preload range condition for each wheel assembly is therefore in middle locations between the location shown in FIG. 2 and the location shown in FIG. 3 and depends on the individual spring stiffness and the torque we desire to transmit to the wheel. Based on tests performed on a 0.34 m diameter wheel, built according to the principles exposed in the present invention, an increase of 4 times of the apparent stiffness can be achieved for a given such wheel for axis loads of the order of 250N. This means that the difference in the hub vertical displacement (overall deformation of the elastic wheel) for a given load placed on the wheel axis, (in the order of 250N), between the "fully preloaded" spring condition and the "minimally preloaded" spring condition, is 400%. In other words, the achieved flexibility variation based on the principle exposed in the present invention can be in the order of 400% (a minimally preloaded wheel presents a deflection 4 times higher than the deflection of the fully preloaded wheel). The degree of deflection of a wheel is generally important, since it affects the section of the wheel periphery that is in contact with the ground, therefore affecting the ground pressure of the wheel and increasing the traction capacity of the wheel on loose soils etc. In FIG. 4 the preferred embodiment of the spring element is presented. The spring is mounted on the rod of each said hub of the wheel from the adequately shaped curved section 12, which is large enough to permit the free rotation of the spring around the mounting rod but yet the spring cannot disengage from the rod. In a similar manner, the other end of the spring 15 is mounted on the tile articulation, permitting the free rotation of the spring around the fixing rod, yet not allowing the spring to disengage from the rod. The spring also comprises a curved section 16, presenting a concave part and a convex part. The spring further comprises a free curved tail 14, placed at the proximity of the mounting section 12 and in the opposite direction of the concave section of the spring. The role of the tail is depicted in FIG. 3 above, showing that in case the two split hubs counter-rotate, the tail is pressed on the next adjacent spring body, preventing the rotation of the springs and contributing to the preload of the springs, generating the increase of stiffness of the wheel.

The forces generated by this counter-rotation of the hubs depend on the stiffness of the springs used. For the presented embodiment, the overall wheel stiffness had values varying from 2.5 kN/m to 10 kN/m, requiring the generation of an important torque for the counter-rotation of the hubs, in the order of 300 Nm for the specific embodiment. This torque is a residual constraint between the two hubs and has to be conserved, otherwise the wheel will lose its pre-set stiffness and become more flexible. A strong rigid lever is used in order to transmit this important torque between the two hubs and is shown on FIG. 5. In this Figure the two hubs are shown dismantled, for better understanding of the different parts. The rigid lever linking the hubs is part 17, which is permanently fixed on hub 2 through the fixing pad 18, and extents to hub 1 traversing the opening 19 where it engages with the flexibility variation mechanism. FIG. 5.1 presents the assembled hubs with all the assembled springs without tiles and the linking lever 17 extending from hub 1. FIG. 5.2 presents the assembled hubs with springs and tiles. FIG. 6 presents the flexibility variation mechanism, which is mounted on a plate 28 that is fixed on hub 1 and rotates together with the wheel rotation. The plate comprises an electric motor 21, that uses power provided by a continuously rotating electrical connection (slip ring) 20, which is mounted on the central, fixed axis of the wheel 32. The motor 21 engages through spur gears to a supplementary reduction gear-train 22, finally engaging a heavy duty ball-screw drive 23 that pulls a double bicycle-type chain 24, on which lever 17 is attached. By the rotation of the said motor, powered through the slip ring 20, it is possible to develop very important forces on the lever 17, producing the counter rotation of the two hubs and resulting to the increase of the stiffness of the wheel. FIG. 7 presents the flexibility variation mechanism assembled and fixed on the side of hub 1, with the double chain 24 mounted on the rigid linking lever 17 and causing its motion relative to the hub 1. FIG. 7 also presents a linear potentiometer 25, used to track the position of the tensioning chariot of the ball-screw drive on the screw, in order to enable the exact regulation of the desired stiffness of the wheel during stiffness variation operation. The potentiometer signal is also transmitted through the said slip ring 20 towards a micro-processor based controller that can be used to operate the wheel.

FIG. 8 presents a cut along the width-wise part of the wheel assembly, where the split hubs 1 and 2 are visible, the flexibility variation motor 21 is shown on the rear part of the figure, while the slip ring 20 is also shown providing power to the flexibility variation motor. The fixed hollow axis of the wheel 32 is also shown, comprising the drive motor of the wheel 27, which engages through spur gears 31, 30 and 29 the internal gear 26 which is fixed inside hub 2, transmitting driving power for the wheel to rotate. A hollow, circular-shaped part 33 is supporting the drive motor while on the same time it permits to the motor to rotate freely inside it and it is fixed inside the hollow axis 32. The FIG. 9 presents in more detail the assembly of the drive-train, with the motor 27 supported longitudinally but free to rotate inside the hollow part 33, with the semi-circular part 39 and 34 supporting the gears and being fixed inside the hollow axis 32 and with the cross-shaped lever 35 being fixed on the front side of the motor 27 and being also able to rotate together with it. FIG. 10 presents the assembly view from the other side, with two sliding bearings 43 supporting the free rotation of the motor inside part 33 (not shown in FIG. 10) and the cross shaped part 35 held in position with the help of two helicoidal springs 36 and 37, which have their other extremities fixed on parts 38 and 39 supporting the gear-train and being fixed inside the hollow axis 32. When the motor generates a torque in order to set the wheel in motion, the spur gear 31 engages on the gear train and tends to transmit this torque. By reaction, this same torque is transmitted on the body of the motor 27, which then rotates in the opposite direction, until the forces generated inside the springs 36 and 37 stop the rotation of the body of the motor. The motion of the motor, is transmitted via the cross-shaped lever part 35 and the linkage 40 towards the lever 41, which is fixed on the rotating axle of a rotating potentiometer 42, which is also fixed on part 34 and connected to the inside of the hollow axis 32. In that way, any torque developed by the motor 27 or even generated externally on the wheel and finally transmitted to the motor (even when the motor is un-powered), is measured by the potentiometer. Therefore, the effort generated inside the gear-train 31, 30, 29 and finally transmitted to the internal gear 26, operating the rotation of the wheel, can be monitored with the said potentiometer 42. It must be noted that the accuracy of the torque measurement depends on the non linear Coulomb friction present in the gear train 29 30 31 and 26. The presence of high friction in this gear-rain, may alter the precision with which the torque is measured. For best results, the transmission ratio used in the said gear-train should not exceed 30:1, depending on the quality of the gears, type of lubricant used, environmental conditions, contamination etc. The present embodiment has a gear ratio of 20:1, with a capacity to generate and measure torques on the wheel periphery in the order of 30 Nm. FIG. 11 presents the assembled wheel with springs, tiles and tensioning mechanism.

The invention claimed is:

1. A variable compliance non-pneumatic wheel, comprising:
   a stationary tubular body (32) attachable to a vehicle chassis and being an axle of rotation of the wheel;
   a tubular member forming a hub (1,2), mounted on the stationary tubular body and being freely rotating relative to the stationary tubular body (32), comprising a series of mounting rods (12,13) on a periphery thereof on both sides facing the two different width-wise sides of the wheel;
   a number of interconnected caterpillar-like tiles (5) which are freely rotating between each-other and form an outer periphery of the wheel, which are in contact with the ground during wheel operation;
   a plurality of connecting spring members, (3,4,6,7,8,9,10,11), each connecting a specific mounting rod (12,13), of a specific side of the hub (1,2) and a periphery of the tiles on the same wheel width-wise side, mounted between the tubular hub and outer tile bodies in a circular circumferential direction and configured to connect the hub (1,2) and the tile bodies (5) to each other;
   wherein the tubular member, forming the hub, is split in two parts (1,2), each one of the two parts being free to rotate relative to the other one of the two parts, with each one of the two parts carrying approximately a half number of the mounting rods (12,13) and the spring members (3,4,6,7,8,9,10,11) on a respective width-wise side of the wheel.

2. The variable compliance non-pneumatic wheel according to claim 1, wherein said spring members (3,4,6,7,8,9,10,11) are formed in a curved shape that promotes bending of the spring members along a radial direction of the wheel, when the wheel is loaded along its radius, while at the same time said spring members present a substantial width on the width-wise direction of the wheel in order to contribute to an increased stiffness of the wheel in an axial direction, therefore avoiding deformation of the wheel in the axial direction.

3. The variable compliance non-pneumatic wheel according to claim 2, wherein said curved spring elements (3,4,6,7,8,9,10,11) are mounted on a first of the two split hubs with a concave side of the curved shape thereof facing always a same circular circumferential direction, and the facing of the concave side of the curved spring elements of the second of the two split hubs is opposite to the facing of the concave side of the spring elements of the first hub, in a way that, when viewed from the side of the wheel, the concave side of said spring elements of each of the first and the second hubs are facing each other.

4. The variable compliance non-pneumatic wheel according to claim 3, wherein said two split hubs (1,2) are able to counter-rotate relative to each other by a few degrees, the counter rotation being in a direction of bringing concave parts of said spring elements mounted on each of the split hubs of each wheel side closer along the circular circumferential direction, as well as bringing the hub-mounting location of each pair of two said spring elements attached on the same tile body also closer, along the circular circumferential direction.

5. The variable compliance wheel according to claim 4, wherein each of said spring elements (3,6,7,8,9,10,11) is formed by a curved shaped body between two mounting points thereof as well as a curved tail, that is also part of the body of the spring element but it is formed after its mounting point on the hub, in a way that forces developed on a main curved body part of the spring element come from relative displacement of the two mounting points of each spring element, which are the mounting rod (12,13) on each said hub (1,2) and a pin on each tile, while forces developed on the tail part of the spring element are developed through contact of said tail part of each spring element with the adjacent main body of the spring element located next to it, that said tail part enters in contact with the main body of the adjacent spring element when said hubs of the wheel counter-rotate, said tail part actually limiting the free rotation of said spring elements on the mounting rods of said hub and conducting each pair of said spring elements that are mounted on the opposite sides of a specific tile to develop forces between them, producing a radial resultant force pushing the tiles outwards in the radial direction and increasing the stiffness of the wheel.

6. The variable compliance wheel according to claim 5, wherein the dual tubular members forming the two split hubs (1,2) are connected via a rigid lever (17), originating and fixed on one of said split hubs (2) and arriving to the second of said split hubs (1), with said second hub having the possibility to rotate relative to the rigid lever for a few degrees, said rigid lever (17) having a motorized element installed on the second wheel hub (1) that can move said connecting lever for a few degrees, modifying relative angle between the two hubs and increasing the contact forces between the curved tail of each said spring element and the main body of said adjacent spring element mounted on the same side of said split hub, forcing each pair of spring elements that are mounted on the opposite sides of a specific tile and connected to the same said tile to develop forces between them, producing a radial resultant force pushing said tile outwards in the radial direction and therefore increasing the stiffness of the wheel.

7. The variable compliance non-pneumatic wheel according to claim 6, wherein said motorized element is electric and powered by a continuous rotation electrical connection (20), carrying electrical power and signals from the stationary axle of rotation of the wheel towards the rotating split hubs of the wheel, said motorized element comprises an electric motor (21) and a very high reduction gearbox (22), which operates the rotation of a heavy duty ball-screw assembly for the generation of the forces needed for wheel stiffness variation, said ball-screw assembly finally engages said rigid lever connecting the split hubs via a bicycle-type chain (24), therefore permitting the generation of very high forces between the two split hubs.

8. The variable compliance wheel according to claim 1, wherein the stationary tubular body (32) attachable to the vehicle chassis and the axle of rotation of the wheel is hollow and comprises a wheel driving electric motor (27), that is engaged via a spur gear to an internal driving gear fixed on one of the two rotating split hubs, wherein said wheel driving electric motor is mounted on a freely rotating joint (43) inside said stationary tubular body forming the wheel axis and is rotatable in the joint by a few degrees; this free rotation of a few degrees of the wheel driving electric motor is constrained by a pair of other springs (36,37), that deform proportionally to the torque developed by said wheel driving electric motor (27), in a way that a developed torque by the wheel driving electric motor produces rotation of an assembly of the entire wheel driving electric motor by a few degrees as well as deformation of said pair of other springs (36,37), without necessarily setting said split hub in motion via the spur gear and the internal driving gear; and said wheel driving electric motor (27) rotation of a few degrees and said deformation of the spring pair is measured by a classic potentiometer (41) or rotary encoder device, mounted axially on a body of the wheel driving electric motor (27) or is transmitted from said body of the wheel driving electric motor via a pair of linkages (40) towards said potentiometer (41) or said rotary encoder that translates the developed torque to an electrical signal.

* * * * *